United States Patent [19]

Neff, deceased et al.

[11] 4,180,839
[45] Dec. 25, 1979

[54] INFORMATION REPRODUCING APPARATUS

[75] Inventors: Joseph J. Neff, deceased, late of Pasadena, Calif., by Lucille D. Neff, executrix, Arcadia, Calif.

[73] Assignee: Bell & Howell Company, Chicago, Ill.

[21] Appl. No.: 784,759

[22] Filed: Apr. 5, 1977

[51] Int. Cl.$^2$ .................. G11B 15/18; G11B 17/00; G11B 21/02
[52] U.S. Cl. .......................... 360/71; 360/75; 360/73; 226/175
[58] Field of Search ............ 360/71, 73, 36, 130, 360/75, 113; 226/175, 34, 191; 310/328, 369, 323

[56] References Cited

U.S. PATENT DOCUMENTS

| | | | |
|---|---|---|---|
| 3,048,665 | 8/1962 | Wilcox | 360/73 X |
| 3,384,767 | 5/1968 | Arnold et al. | 310/369 X |
| 3,396,890 | 8/1968 | Fulton | 310/323 X |
| 3,524,196 | 8/1970 | Church et al. | 310/328 |
| 3,559,192 | 1/1971 | Schlossbauer | 360/63 |
| 3,706,861 | 12/1972 | Giel | 360/75 X |

OTHER PUBLICATIONS

IBM Technical Disclosure Bulletin, vol. 15, No. 10, 3-1973, Closed-loop Head Positioning Apparatus, by Grant et al.

*Primary Examiner*—John H. Wolff
*Attorney, Agent, or Firm*—Benoit Law Corporation

[57] ABSTRACT

Apparatus are disclosed for reproducing information from an information carrying tape wherein the tape is advanced by the imposition of a first force longitudinally of the tape, and wherein a second force extending into the plane of the tape at an angle to the first force is imposed. A flutter component is detected in information reproduced from the tape, and the second force is varied in response to the detected flutter component in the sense of a flutter reduction. Advantageously, the mentioned first force may be varied in response to a low-frequency flutter component, while the second force may be varied in respone to a high-frequency flutter component. Piezoelectric tape drive capstan, tape guiding and reproduce head actuating or mounting systems are also disclosed.

24 Claims, 6 Drawing Figures

INFORMATION REPRODUCING APPARATUS

BACKGROUND OF THE INVENTION

1. Field of the Invention

The subject invention relates to information recording and reproduction and, more specifically, to the reproduction of information from an information carrying tape, to flutter correcting systems, and to piezoelectric tape drive capstans and tape guiding and reproduction head actuating or mounting devices and systems.

2. Description of the Prior Art

Efforts to counteract time base errors, such as flutter, with electromechanical means are of long standing. Prominent in this area are movable reproduce heads for compensating flutter and skew errors. In prior-art systems of this type, reproduce heads are either moved linearly back and forth in parallel to the direction of tape advance or are moved angularly with and against the tape advance in order to provide for a compensation of time base errors, as may for instance be seen from U.S. Pat. No. 3,761,646, by Jean Pierre Beauviala, issued Sept. 25, 1973; Gomer L. Davies, Magnetic Tape Instrumentation, (McGraw-Hill 1961), Chapters 6.2 and 6.3; and Harry F. Olson et al, A Magnetic Tape System for Recording and Reproducing Standard FCC Color Television Signals, RCA REVIEW, Sept. 1956, pp. 330 to 357 etc.

Systems of this type are generally complex in their practical execution, are relatively inert, difficult to operate successfully and liable to generation of tape wear and other detrimental effects through continual friction relative to the information carrier layer of the tape.

These disadvantages have persisted in the area under consideration despite a large variety of proposals concerning the control of moving webs and the control of various devices with the aid of rapidly acting crystal transducing devices. Representatives of such devices and systems are apparent from U.S. Pat. No. 2,666,512, by E. O. Codier, issued Jan. 19, 1954, U.S. Pat. No. 3,387,295, by D. L. De Moss, issued June 4, 1968, U.S. Pat. No. 3,559,192, by H. Schlossbauer, issued Jan. 26, 1971, U.S. Pat. No. 3,577,021, by I. F. Gerks, issued May 4, 1971, and J. A. Baring, Control of Moving Webs, MACHINE DESIGN, September 1953, pp. 151 et seq.

SUMMARY OF THE INVENTION

It is broadly an object of this invention to overcome the above mentioned disadvantages.

It is a germane object of this invention to provide improved systems and devices for reproducing information from an information carrying medium or tape.

It is a related object of this invention to improve the correction of time base errors, such as flutter in the reproduction of information from an information carrier.

It is also an object of this invention to provide improved tape drive capstan, tape guiding and reproduce head operating or mounting devices and systems.

It is further an object of this invention to provide improved piezoelectric devices and systems for information reproduction purposes.

Other objects of this invention will become apparent in the further course of this disclosure.

From one aspect thereof, the subject invention resides in apparatus for reproducing information from an information carrying tape and, more specifically, resides in the improvement comprising, in combination, means including a tape capstan having an annular layer of piezoelectric material for advancing the tape, means for reproducing information from the advancing tape, means connected to said reproducing means for detecting a flutter component in reproduced information, and means connected to the detecting means and operatively associated with the layer of piezoelectric material for varying the diameter of the annular layer of piezoelectric material in response to the detected flutter component in the sense of a reduction of the flutter component.

From another aspect thereof, the invention resides in apparatus for reproducing information from an information carrying tape and, more specifically, resides in the improvement comprising, in combination, means for advancing the tape including a fixed-diameter capstan applied to said tape, means for guiding the advancing tape, including a movable tape guide member, means for reproducing information from the advancing tape including a stationary reproduce head engaging said tape and being spaced from said capstan by a distance extending along said tape, means for detecting a flutter component in reproduced information, means including a layer of piezoelectric material connected to the tape guide member for selectively moving the tape guide member in response to dimensional variations of the layer of piezoelectric material, and means connected to the detecting means and operatively associated with the layer of piezoelectric material for subjecting the layer of piezoelectric material to dimensional variations in response to the detected flutter component and moving the tape guide member in the sense of a reduction of the flutter component.

From another aspect thereof, the invention resides in apparatus for reproducing information from an information carrying tape and, more specifically, resides in the improvement comprising, in combination, means for advancing the tape including a fixed-diameter cpastan, means including a playback transducer engaging said tape and being spaced from said capstan by a distance extending along said tape for reproducing information from the advancing tape, means connected to the reproducing means for detecting a flutter component in reproduced information, means including a layer of piezoelectric material connected to the playback transducer for selectively moving the playback transducer in response to dimensional variations of the layer of piezoelectric material, and means connected to the detecting means and operatively associated with the layer of piezoelectric material for subjecting the layer of piezoelectric material to dimensional variations in response to the detected flutter component and moving the playback transducer in the sense of a reduction of the flutter component.

From yet another aspect thereof, the invention resides in apparatus for reproducing information from an information carrying tape and, more specifically, resides in the improvement comprising, in combination, means operatively associated with the tape for exerting on the tape a first force longitudinally of the tape for advancing the tape, means operatively associated with the tape for reproducing information from the advancing tape, means connected to the reproducing means for detecting a flutter component in reproduced information, and means connected to the detecting means and operatively associated with the tape for exerting on the tape a second force extending into the plane of the tape at an angle to the first force and varying in response to the detected flutter component in the sense of a reduction of the flutter component.

From a further aspect thereof, the invention resides in apparatus for reproducing information from an information carrying tape and, more specifically, resides in the improvement comprising, in combination, means operatively associated with the tape for exerting on the tape a first force longitudinally of the tape for advancing the tape, means operatively associated with the tape for reproducing information from the advancing tape, means connected to the reproducing means for detecting flutter in reproduced information, means connected to the detecting means for separating the detected flutter into a first flutter component covering a first frequency range and into a second flutter component covering a second frequency range higher than the first frequency range, means connected to the separating means and to the first force exerting means for varying the first force in response to the first flutter component in the sense of a reduction of the first flutter component, and means connected to the separating means and operatively associated with the tape for exerting on the tape a second force extending into the plane of the tape at an angle to the first force and varying in response to the second flutter component in the sense of a reduction of the second flutter component.

From a further object thereof, the invention resides in apparatus for reproducing information from an information carrying tape and, more specifically, resides in the improvement comprising, in combination, means for advancing the tape including a tape drive capstan, and means for varying the diameter of the capstan including a radially active annular piezoelectric layer on the capstan, and means connected to the layer for selectively varying the thickness of the annular layer.

From yet another aspect thereof, the invention resides in apparatus for reproducing information from an information carrying tape advanced with the aid of a fixed-diameter capstan and, more specifically, resides in the improvement comprising, in combination, means engaging the tape and being spaced from said capstan by a distance extending along said tape for reproducing information from the advancing tape, and means coupled to the information reproducing means for selectively moving the reproducing means into and relative to the plane of the tape, including piezoelectric means coupled to the information reproducing means and means connected to the piezoelectric means for selectively energizing the piezoelectric means.

BRIEF DESCRIPTION OF THE DRAWINGS

The invention and its various aspects and objects will become more readily apparent from the following detailed description of preferred embodiments thereof, illustrated by way of example in the accompanying drawings, wherein like reference numerals designate like or functionally equivalent parts, and wherein.

DESCRIPTION OF PREFERRED EMBODIMENTS

Figure 1:
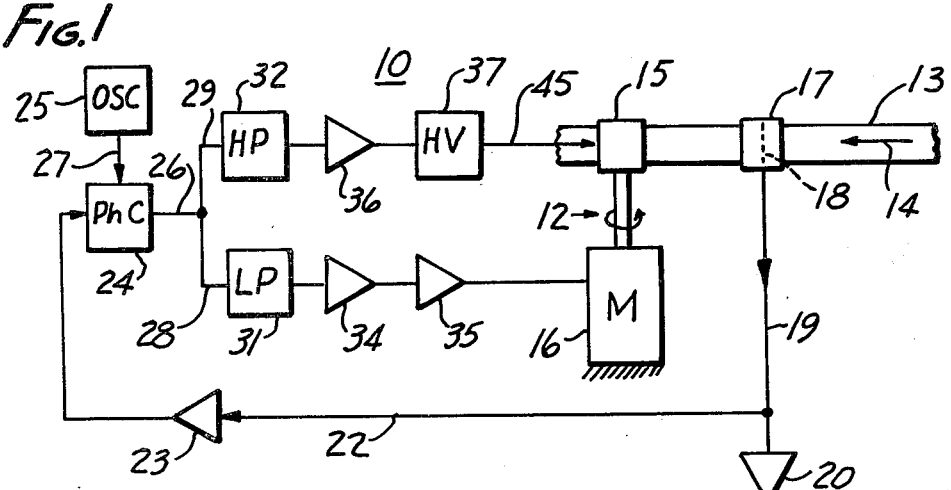
FIG. 1 is a block diagram for an information reproducing system with error correction according to a preferred embodiment of the subject invention.

The information reproducing and error correcting system 10 according to the preferred embodiment shown in FIG. 1 includes a tape drive 12 which advances an information carrying tape, such as in the form of a magnetic recording tape 13 in the direction of the arrow 14. To this end, the tape drive 12 includes a capstan 15 in force-transmitting relationship with the tape, and a control or variable speed motor 16 for driving or rotating the capstan 15.

The system 10 further includes means for reproducing information from the advancing tape, including a magnetic reproduce head 17, contacting the advancing tape 13 and picking up magnetically recorded signals or information from the advancing tape at an air gap 18 and providing a corresponding reproduced signal in a head output lead 19.

As known to those skilled in the art, many methods have been proposed for deriving flutter-indicative signals from an advancing information carrying tape. Without intending to limit the generality of this broadly stated fact and its applicability in the practice of the subject invention, a few examples of suitable techniques for providing flutter information will presently be mentioned.

In particular, a relatively old technique for picking up flutter information resides in the provision of stroboscopic markings along the tape 13, such as in the form of a ladder or line pattern having actual or virtual lines extending transversely of the tape.

This stroboscopic pattern may, for instance, be of an optically, magnetically or electrically discernible type, and the reproduce head 17 may, correspondingly, be of an optical, magnetic or capacitive pickup type, for instance. Another well-known technique magnetically records a pilot tone or signal on the magnetic tape 13 and, during playback of the other recorded information, reproduces such signal with a magnetic reproduce head 17 to provide in the lead 19 a correspondingly electric signal containing the same time-base errors or flutter components as the otherwise reproduced information. In accordance with conventional practice, such pilot tone or signal may be recorded in a distinct control track, in which case the reproduce head 17 need cover only the width of the control track as far as the reproduction of the pilot tone or signal is concerned. Yet other conventional methods provide the pilot signal within the recorded and reproduced information itself, such as in the form of one or more tones modulated on a high-frequency information carrier. Of course, if the information to be primarily recorded and reproduced is of a constant-frequency, modulated-amplitude type, or is modulated on a constant-frequency information carrier, then the flutter-indicative information may be derived from the constant-frequency signal or carrier itself, as the originally constant frequency will be subjected to time base or phase errors to be compensated in accordance with the principles of the subject invention.

The system shown in FIG. 1 provides signal amplifying facilities 20 having preferably bandwidth limiting facilities for extracting the recorded and reproduced information from the playback signal in the lead 19, in those cases where the reproduce head 17 also plays back the recorded information content in addition to the flutter-indicative information. The resulting reproduced data may then be made available at a terminal 21 for further processing which may, for instance, include a display of recorded video information, an aural reproduction in the case of sound recordings, a graphical representation or other display in the case of an instrumentation tape recording, or such other processing as conforms to the intended purpose of the recording and reproduction process.

While the subject invention and its embodiment are not limited to any particular manner of deriving an error signal from the picked-up flutter-indicative signal, a preferred manner is shown in FIG. 1.

More specifically, a lead 22 is connected to the lead 19 in order to apply the flutter-affected signal to an amplifier 23 which may have bandpass or such other characteristics as may in a given case be necessary for a distinction between the reproduced general information on the one hand and the flutter information on the other.

Blocks 24 and 25 symbolize any means for providing at a lead 26 an error signal representing the picked-up flutter. For instance, the block 25 may comprise a local oscillator providing a stable frequency signal along a lead 27 to a phase comparator 24 which, as its name implies, compares the reproduced flutter-indicative signal and the local oscillator signal in terms of frequency or phase and which further provides in the lead 26 the error signal requisite to a correction or compensation of the picked-up flutter.

If desired, the phase comparator 24 may include the familiar servo loop wherein a phase detector having the requisite two inputs for the local oscillator and the reproduced flutter signal, is followed by a loop filter and a voltage controlled oscillator for producing the error signal. Reference may in this respect be had to the following U.S. Patents herewith incorporated by reference herein: U.S. Pats. No. 2,979,558 by E. M. Leyton, issued Apr. 11, 1961, No. 3,678,397, by Bert H. Dann, issued July 18, 1972, and No. 3,697,673, by Bert H. Dann, issued Oct. 10, 1972.

The time base or flutter error signal is applied by the lead 26 to a pair of branches 28 and 29.

The branch 28 may broadly be referred to as the "low-pass" branch and the branch 29 as the "high-pass" branch, since the branch 28 includes a low-pass filter 31 connected to the detecting means 24 for separating the detected flutter into a first flutter component covering a first frequency range, while the branch 29 includes a high-pass or bandpass filter 32 for separating the detected flutter into a second flutter component covering a second frequency range higher than the first frequency range.

It is the purpose of the lower frequency branch 28 to control the tape drive motor 16 with the lower frequency component of the picked-up flutter. To this end, the filter 31 may feed into a compensation amplifier 34 which may have the customary lead lag and Bodie plot features as conventional in the tape transport art. The compensation amplifier 34 feeds into a power amplifier 35 which, in turn, energizes the motor 16 and controls its rate of rotation and thereby the rate of rotation of the tape drive capstan 15.

The filter 32 in the higher frequency branch 29 feeds into a compensation amplifier 36 which may have a nonlinear characteristic to provide a bandpass feature including a drop-off at noise level. The compensation amplifier 36, in turn, feeds into a driver 37 which may include a variable high-voltage (HV) source for driving the capstan 15 in a manner presently to be described.

In particular, the capstan 15 may have a shaft 41 connected to and driven by the symbolically illustrated motor 16. On the shaft 41, the capstan has a radially active annular piezoelectric hollow-cylindrical structure or layer 42, the wall thickness of which is selectively variable for a controlled variation of the effective diameter of the capstan 15.

Piezoelectric hollow-cylindrical structures or layers of the type used at 42 are known as such, having been proposed as connecting links between mechanical equipment and electronic circuits in such publications as Charles Edmiston, Piezoelectric Ceramic Transducers, ELECTRONIC DESIGN, 18, Sept. 1, 1974, pp. 78 to 82. Reference in this connection and with respect to the embodiments in the other drawing figures may also be had to Jim McDermott, Focus on Piezoelectric Crystals and Devices, ELECTRONIC DESIGN, 17, Aug. 16, 1973, pp. 44 to 54, to the bibliography on the latter page 54, and to Dr. Walter Guyton Cady, PIEZOELECTRICITY (Dover Publications 1964) Chapters XIII et seq.

The piezoelectric layer 42 is provided with a metallic or other electrically conductive cylindrical surface coating 43. The output of the high voltage driver 37 in the high-frequency branch 29 is applied to the surface coating 43 such as via a lead 45 and a carbon brush or other electrical potential applicator 46 in electrical contact with the coating 43.

The capstan 15, driven by the motor 16 exerts on the tape 13 a first force 48 longitudinally of the tape in order to advance the tape past the reproduce head 17 and between such conventional equipment as supply and takeup tape reels, loop forming and constant tension devices and other customary tape transport means, as desired.

In the illustrated preferred embodiment of FIG. 1, the amplifiers 34 and 35, connected to the separating means including the low-pass filter 31, are operative to vary the first force 48 in response to the first or low-frequency flutter component in the sense of a reduction of that first flutter component. In this respect, the motor 16 with rotating capstan 15 operates as a variable force exerting means on the tape 13.

The capstan 15 with its piezoelectric layer 42, in turn, also operates as a second force exerting means on the tape 13, in that the diameter variations of the piezoelectric layer 42 exert on the tape a second force 49 extending in the plane of the tape (the plane being parallel to the tape surface seen in FIG. 2) at an angle to the first force 48 and varying in response to the second or high-frequency flutter component in the sense of a reduction of that second flutter component picked up by the filter 32 in the upper frequency branch 29.

Figure 2:
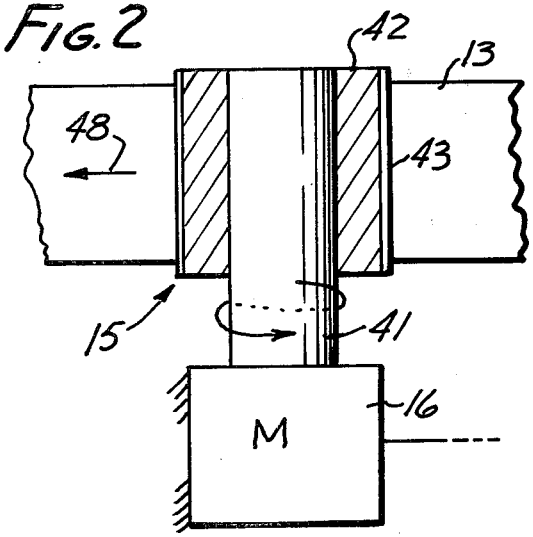
FIG. 2 is an elevation, partially in section, of a tape drive capstan with associated parts according to a preferred embodiment of the subject invention.
Figure 3:
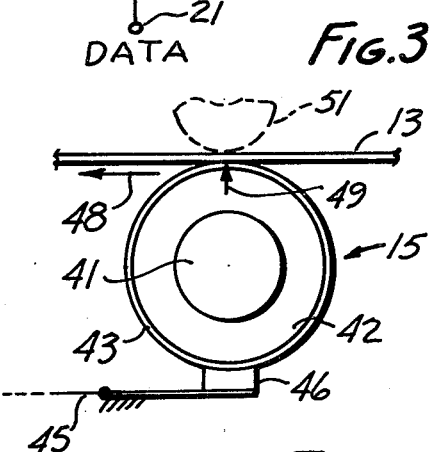
FIG. 3 is a top view of FIG. 2.

While the operation of the preferred embodiments of FIGS. 2 and 3 has so far been explained in terms of force applications to the tape 13, it may also be considered that the piezoelectric capstan 16 is effectively varying its diameter under the control of the upper frequency loop 29, with different effective capstan diameters resulting in different effective tape velocities in the direction of the arrow 14 or, more generally, with varying capstan diameters resulting in correspondingly varying tape advance velocities or speeds.

Auxiliary equipment may include a nip or pinch roller 51 indicated in dotted lines in FIG. 3 for the purpose of pressing the tape 13 into force-transmitting relationship with the capstan 15. Such rollers are not always favored in high-precision tape transport, and the roller 51 may be rendered dispensable by an appropriate wrap angle of the tape 13 about the capstan 15 and/or by a high-friction surface at 43 on the capstan. Further auxiliary equipment may include an ionizer or an equivalent device (not shown) for removing possibly undesired electrostatic charges from the tape 13 between the capstan 15 and the reproduce heads 17 etc.

The embodiment shown in FIG. 1 is very advantageous in that it relegates low-frequency flutter compensation to the capstan drive motor control, and the high-frequency flutter compensation to the piezoelectric device.

This kills two birds with one stone, since the piezoelectric device, having naturally a very fast response characteristic, is in a much better position than the motor control or any other significantly mechanical device to correct medium and high-frequency flutter. The low-frequency motor control, on the other hand, is readily able to provide a flutter component compensation which a piezoelectric device could only provide at tremendous power requirements rapidly approaching or even exceeding the capabilities of piezoelectric systems.

In this respect, the subject invention is not intended to be limited to piezoelectric devices even though those devices are presently considered to provide the best mode for carrying the subject invention into effect. This applies particularly to the mentioned high-frequency correction capabilities of the upper branch 29.

On the other hand, it should be understood that the subject invention is also not limited to a variation of the force 48 in response to any flutter component. Rather, the motor 16 may be energized from a constant current source or by other energizing equipment not necessarily including the low-frequency branch 28. In that case, only the piezoelectric device 42 of the capstan 15 would be energized in a flutter-compensating manner.

Conversely, the tape drive capstan may be employed without the piezoelectric device 42. In that case, the shaft 41 rotated by the motor 16 may directly be used and applied to the tape 13 without the intermediary of any piezoelectric or other diameter variation device. This has been shown in FIG. 5. The motor 16 may be energized for a low-frequency flutter compensation and variation of the first force 48 as shown and described in connection with FIG. 1. Conversely, the motor 16 may be energized without regard to a flutter compensation, depending on the application and desired function of the tape transport.

Figure 4:
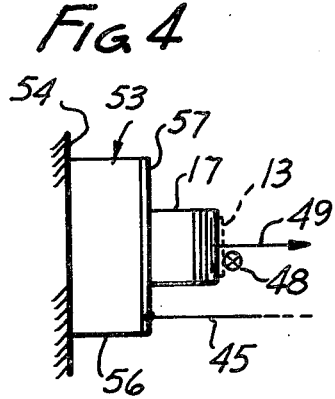
FIG. 4 is a side view of a modified information reproduce head according to a preferred embodiment of the subject invention.
Figure 5:
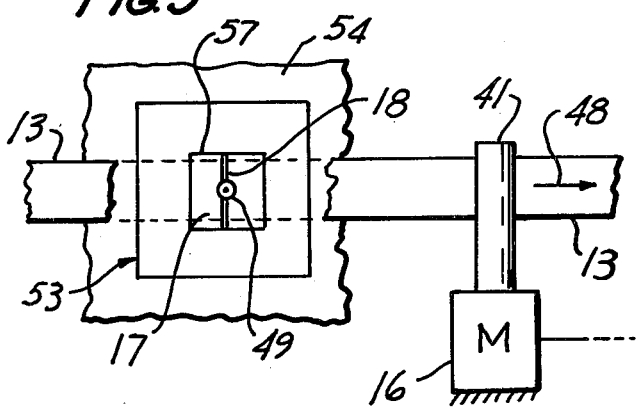
FIG. 5 is a front elevation of the device of FIG. 4.

FIGS. 4 and 5 show a preferred embodiment of the invention which may, for instance, be used in the circuit of FIG. 1 in addition to, or preferably in lieu of, the piezoelectric device 42 of the tape drive capstan 15.

According to FIGS. 4 and 5, a reproduce head, such as the reproduce head 17 engages the tape 13, is spaced from the shaft or capstan 41 by a distance extending along the tape 13 and is located on a mounting pad 53 for the reproduce head. The mounting pad 53, in turn, is located on a preferably relatively stationary base 54 and includes a piezoelectric layer 56 which has a variable thickness between the reproduce head 17 and base 54. The layer 56 has a surface coating 57 for applying an electric energizing potential via the lead 45 to the piezoelectric layer 56 for selectively varying its thickness in the sense of a flutter compensation.

Figure 6:
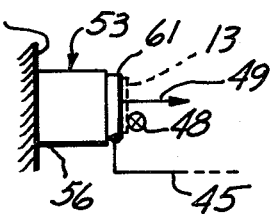
FIG. 6 is a side view of a tape guiding device in accordance with a further preferred embodiment of the subject invention.

The base 54 in the embodiment of FIGS. 4 to 6, or the shaft 41 in the embodiment of FIGS. 1 to 3 may be grounded or otherwise serve as a reference potential electrode for the piezoelectric device. During the operation of the device, the piezoelectric mounting pad 53 will selectively move the reproducing head 17 into and relative to the plane of the tape as the piezoelectric layer 56 is selectively energized via the branch 29 and driver 37.

In addition to, or instead of energizing the capstan 15 and/or head mounting pad 53, the driver 73 may cause the variable force 49 to be imposed by a tape guide. As shown in FIG. 6, a suitable tape guide may include a member 61 having a smooth surface similar to the active surface of the reproduce head 17. A pad 53 has again a piezoelectric layer 56 and mounts the tape guiding device 61. If desired, the layer 57 may be dispensed with and the guide 61 may be employed as an electrode for applying the piezoelectric driver potential via lead 45.

The energized piezoelectric device 53 moves the tape guide 61 into and relative to the plane of the tape, imposing a variable force 49 thereon in the sense of a flutter compensation. The guide of FIG. 6 may be used together with a stationary reproduce head 17, and with a fixed-diameter capstan 41 as shown in FIG. 5.

The above mentioned first force 48 is again imposed to advance the tape relative to the tape guide 61 and to whatever reproduce equipment is employed in the particular instance. If the tape drive motor is energized in the manner shown in FIG. 1, then the first force 48 is variable as discussed above. As before, the equipment shown in FIG. 1 then provides a servo system including the information reproducing means or head 17, the flutter detecting means 24 etc. and the piezoelectric means for continuously correcting the flutter component, such as in response to dimensional variations to which a layer of piezoelectric material is subjected in response to a detected flutter component.

As shown by way of example in the drawings, the mentioned layer of piezoelectric material may be planar as shown in FIGS. 4 to 6 or curved as shown in FIGS. 2 and 3.

While the subject invention broadly contemplates movement of reproduce heads and/or tape guides by piezoelectric devices, the preferred embodiments shown in FIGS. 4 to 6, wherein the piezoelectric device is in the form of a mounting pad, is particularly advantageous for its simple construction, reliable operation and absence of force-transmitting linkages which introduced complexities and wear and tear in prior-art devices.

The subject extensive disclosure will render apparent or suggest various modifications and variations within the spirit and scope of the subject invention to those skilled in the art.

What is claimed is:

1. In apparatus for reproducing information from an information carrying tape, the improvement comprising in combination:
   means including a tape capstan having an annular layer of piezoelectric material for advancing said tape;

means for reproducing information from said advancing tape;

means connected to said reproducing means for detecting a flutter component in reproduced information; and means connected to said detecting means and operatively associated with said layer of piezoelectric material for varying the diameter of said annular layer of piezoelectric material in response to said detected flutter component in the sense of a reduction of said flutter component.

2. Apparatus as claimed in claim 1, wherein:

said layer of piezoelectric material is hollow-cylindrical.

3. Apparatus as claimed in claim 1, including:

a servo system comprising said information reproducing means, said detecting means, said diameter varying means and said annular layer of piezoelectric material for continuously correcting said flutter component.

4. In apparatus for reproducing information from an information carrying tape, the improvement comprising in combination:

means for advancing said tape including a fixed-diameter capstan applied to said tape;

means for guiding said advancing tape, including a movable tape guide member;

means for reproducing information from said advancing tape including a stationary reproduce head engaging said tape and being spaced from said capstan by a distance extending along said tape;

means for detecting a flutter component in reproduced information;

means including a layer of piezoelectric material connected to said tape guide member for selectively moving said tape guide member in response to dimensional variations of said layer of piezoelectric material; and means connected to said detecting means and operatively associated with said layer of piezoelectric material for subjecting said layer of piezoelectric material to dimensional variations in response to said detected flutter component and moving said tape guide member in the sense of a reduction of said flutter component.

5. Apparatus as claimed in claim 4, wherein:

said layer of piezoelectric material is planar.

6. Apparatus as claimed in claim 4, wherein:

said guiding means include a support for said movable tape guide member; and said layer of piezoelectric material is located between said support and said tape guide member for moving said tape guide member relative to said support in response to said dimensional variations.

7. Apparatus as claimed in claim 4, wherein:

said guiding means include a support for said movable tape guide member;

said layer of piezoelectric material is planar and located between said support and said tape guide member for moving said tape guide member relative to said support in response to variations in thickness of said layer of piezoelectric material; and said dimensional variations subjecting means include means for varying the thickness of said layer of piezoelectric material in response to said detected flutter component and moving said tape guide member in the sense of a reduction of said flutter component.

8. Apparatus as claimed in claim 4, including:

a servo system comprising said information reproducing means, said detecting means, said dimensional variation subjecting means and said layer of piezoelectric material for continuously correcting said flutter component.

9. In apparatus for reproducing information from an information carrying tape, the improvement comprising in combination:

means for advancing said tape including a fixed-diameter capstan;

means including a playback transducer engaging said tape and being spaced from said capstan by a distance extending along said tape for reproducing information from said advancing tape;

means connected to said reproducing means for detecting a flutter component in reproduced information;

means including a layer of piezoelectric material connected to said playback transducer for selectively moving said playback transducer in response to dimensional variations of said layer of piezoelectric material; and means connected to said detecting means and operatively associated with said layer of piezoelectric material for subjecting said layer of piezoelectric material to dimensional variations in response to said detected flutter component and moving said playback transducer in the sense of a reduction of said flutter component.

10. Apparatus as claimed in claim 9, wherein:

said layer of piezoelectric material is planar.

11. Apparatus as claimed in claim 9, wherein:

said information reproducing means include a support for said playback transducer; and said layer of piezoelectric material is located between said support and said playback transducer for moving said playback transducer relative to said support in response to said dimensional variations.

12. Apparatus as claimed in claim 9, wherein:

said information reproducing means include a support for said playback transducer;

said layer of piezoelectric material is planar and located between said support and said playback transducer for moving said playback transducer relative to said support in response to variations in thickness of said layer of piezoelectric material; and said dimensional variations subjecting means include means for varying the thickness of said layer of piezoelectric material in response to said detected flutter component and moving said playback transducer in the sense of a reduction of said flutter component.

13. Apparatus as claimed in claim 9, including:

a servo system comprising said information reproducing means, said detecting means, said dimensional variation subjecting means and said layer of piezoelectric material for continuously correcting said flutter component.

14. In apparatus for reproducing information from an information carrying tape, the improvement comprising in combination:

means including a fixed-diameter capstan applied to said tape for exerting on said tape a first force longitudinally of said tape for advancing said tape;

means operatively associated with said tape and including a stationary reproduce head spaced from said capstan by a distance extending along said tape for reproducing information from said advancing tape;

means connected to said reproducing means for detecting a flutter component in reproduced information; and means connected to said detecting means and operatively associated with said tape for exerting on said tape a second force extending into the plane of said tape at an angle to said first force and varying in response to said detected flutter component in the sense of a reduction of said flutter component;

said second force exerting means including a tape guide for said tape including piezoelectric transducer means for exerting on said tape said second force extending into the plane of said tape, and means connected to said detecting means and to said piezoelectric transducer means for energizing said piezoelectric transducer means for varying said second force in response to said detected flutter component in the sense of a reduction of said flutter component.

15. In apparatus for reproducing information from an information carrying tape, the improvement comprising in combination:

means operatively associated with said tape for exerting on said tape a first force longitudinally of said tape for advancing said tape;

means operatively associated with said tape for reproducing information from said advancing tape;

means connected to said reproducing means for detecting a flutter component in reproduced information; and means connected to said detecting means and operatively associated with said tape for exerting on said tape a second force extending into the plane of said tape at an angle to said first force and varying in response to said detected flutter component in the sense of a reduction of said flutter component;

said first force exerting means and said second force exerting means jointly including a tape drive capstan rotatable in force-transmitting contact with said tape and having a variable diameter;

said first force exerting means further including means for rotating said capstan; and said second force exerting means further including means connected to said detecting means and to said capstan for varying the diameter of said capstan in response to said detected flutter component in the sense of a reduction of said flutter component.

16. In apparatus for reproducing information from an information carrying tape, the improvement comprising in combination:

means including a fixed-diameter capstan applied to said tape for exerting on said tape a first force longitudinally of said tape for advancing said tape;

means operatively associated with said tape for reproducing information from said advancing tape;

means connected to said reproducing means for detecting a flutter component in reproduced information; and means connected to said detecting means and operatively associated with said tape for exerting on said tape a second force extending into the plane of said tape at an angle to said first force and varying in response to said detected flutter component in the sense of a reduction of said flutter component;

said reproducing means including an information reproduce head engageable with said tape and spaced from said capstan by a distance extending along said tape; and said second force exerting means including means coupled to said reproduce head and connected to said detecting means for moving said reproduce head into and relative to the plane of said tape in response to said detected flutter component in the sense of a reduction of said flutter component.

17. Apparatus as claimed in claim 16, wherein:

said moving means include piezoelectric transducer means coupled to said reproduce head and means connected to said detecting means for energizing said piezoelectric transducer means for moving said reproduce head into and relative to the plane of said tape in response to said detected flutter component in the sense of a reduction of said flutter component.

18. In apparatus for reproducing information from an information carrying tape, the improvement comprising in combination:

means operatively associated with said tape for exerting on said tape a first force longitudinally of said tape for advancing said tape;

means operatively associated with said tape for reproducing information from said advancing tape;

means connected to said reproducing means for detecting flutter in reproduced information;

means connected to said detecting means for separating said detected flutter into a first flutter component covering a first frequency range and into a second flutter component covering a second frequency range higher than said first frequency range;

means connected to said separating means and to said first force exerting means for varying said first force in response to said first flutter component in the sense of a reduction of said first flutter component; and means connected to said separating means and operatively associated with said tape for exerting on said tape a second force extending into the plane of said tape at an angle to said first force and varying in response to said second flutter component in the sense of a reduction of said second flutter component.

19. Apparatus as claimed in claim 18, wherein:

said second force exerting means include piezoelectric transducer means for exerting on said tape said second force extending into the plane of said tape, and means connected to said separating means and to said piezoelectric transducer means for energizing said piezoelectric transducer means for varying said second force in response to said second flutter component in the sense of a reduction of said second flutter component.

20. Apparatus as claimed in claim 18, wherein:

said first force exerting means and said second force exerting means jointly include a tape drive capstan rotatable in force-transmitting contact with said tape and having a variable diameter;

said first force exerting means further include means connected to said separating means and coupled to said capstan for imposing on said capstan a rotation varying in response to said first flutter component in the sense of a reduction of said first flutter component; and said second force exerting means further include means connected to said separating means and to said capstan for varying the diameter of said capstan in response to said second flutter component in the sense of a reduction of said second flutter component.

21. Apparatus as claimed in claim 18, wherein:

said reproducing means include an information reproduce head engageable with said tape; and said second force exerting means include means coupled to said reproduce head and connected to said separating means for moving said reproduce head into and relative to the plane of said tape in response to said second flutter component in the sense of a reduction of said second flutter component.

22. Apparatus as claimed in claim 21, wherein:

said moving means include piezoelectric transducer means coupled to said reproduce head and means connected to said separating means for energizing said piezoelectric transducer means for moving said reproduce head into and relative to the plane of said tape in response to said second flutter component in the sense of a reduction of said second flutter component.

23. In apparatus for reproducing information from an information carrying tape advanced with the aid of a fixed-diameter capstan, the improvement comprising in combination:

means engaging said tape and being spaced from said capstan by a distance extending along said tape for reproducing information from said advancing tape; and means coupled to said information reproducing means for selectively moving said reproducing means into and relative to the plane of said tape, including piezoelectric means coupled to said information reproducing means and means connected to said piezoelectric means for selectively energizing said piezoelectric means.

24. An apparatus as claimed in claim 13, wherein:

said information reproducing means include an information reproduce head engageable with said tape; and said moving means include a mounting pad for said reproduce head including a variable thickness piezoelectric layer for selectively moving said reproduce head into and relative to the plane of the tape, and means connected to said layer for selectively varying the thickness of said layer.

* * * * *